March 10, 1964　　H. C. EBERLINE　　3,124,684
PLUTONIUM DETECTOR
Filed July 6, 1959

INVENTOR
H.C. EBERLINE

BY
ATTORNEY

United States Patent Office 3,124,684
Patented Mar. 10, 1964

3,124,684
PLUTONIUM DETECTOR
Howard C. Eberline, Santa Fe, N. Mex., assignor to Eberline Instrument Corporation, Santa Fe, N. Mex.
Filed July 6, 1959, Ser. No. 825,140
1 Claim. (Cl. 250—71.5)

The present invention relates to the detection of radioactive material and more particularly to the detection of plutonium which may be spread by accident and to provide a means to rapidly detect and map the area having the radioactive material with a minimum of danger to persons.

Heretofore, various types of detectors for radioactive material have been used and the conventional types have been effective by using the effect of the alpha particles on electrodes in an ionization chamber and by the effect of alpha particles on fluorescent material to produce scintillations. However, the alpha particles have such a low penetration level as to make it essential to use an alpha probe very close to the source of radiation in order to detect the alpha particles. The spacing of the alpha detection probe usually cannot be over an inch and preferably half an inch to a quarter of an inch from such radiation. Further, the presence of almost any obstruction will prevent the detection of the alpha particles. Consequently, the prior art devices which relied on alpha detection have not satisfactorily solved the problem of monitoring the large areas which may be contaminated with radiation. In the event of contamination of a person by plutonium it has been the practice to cut away the flesh to be sure the source of radiation is removed because there was no practical way of detecting its presence since the failure to detect alpha particles was not conclusive of the absence of contamination since alpha particles could be so easily stopped by obstructions.

An object of the present invention is to overcome the problem of detection of a radioactive material and particularly plutonium by providing equipment by which radiation can be detected at a substantial distance from the source so the equipment may be carried by a vehicle thereby hastening the monitoring of a large contaminated area to obtain the boundaries thereof so that the source of radiation may be removed to permit normal use of the area.

A further object is to provide a method of detection which will give a positive and accurate identification of the material.

Another object is to provide a scintillation detector which is responsive to gamma rays of a particular energy value and to be responsive only to that level thereby positively identifying the material.

Figure 1:
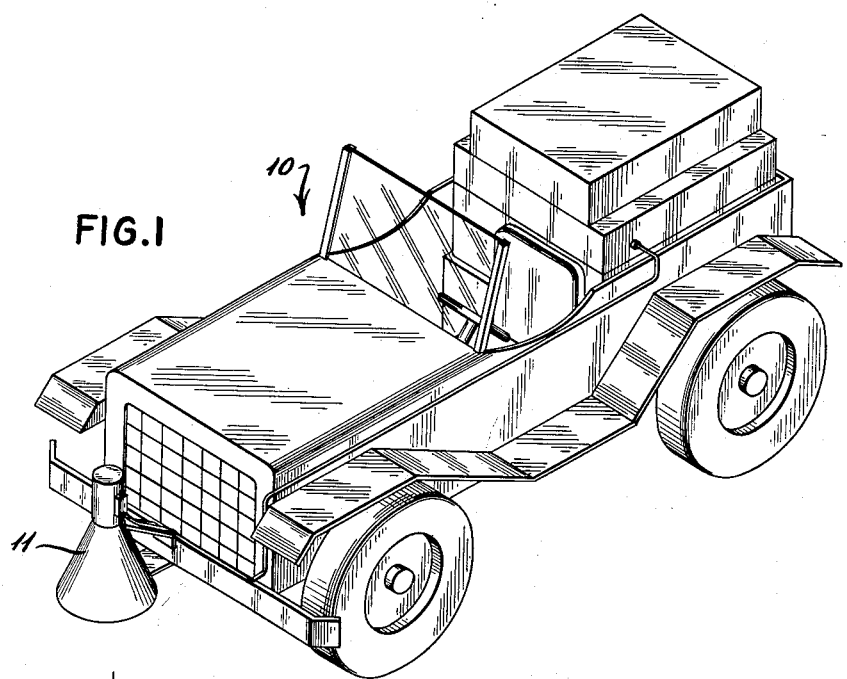
Figure 2:
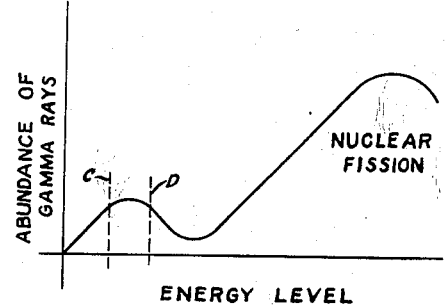

Other and further objects will be apparent as the description proceeds and upon reference to the accompanying drawing wherein:

FIG. 1 is a perspective of a vehicle equipped with a radiation detector monitoring device of the present invention;

FIG. 2, a graph showing the approximate energy levels and the abundance of gamma radiation.

Figure 3:
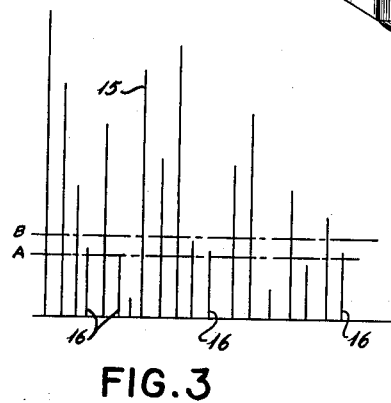
Figure 4:
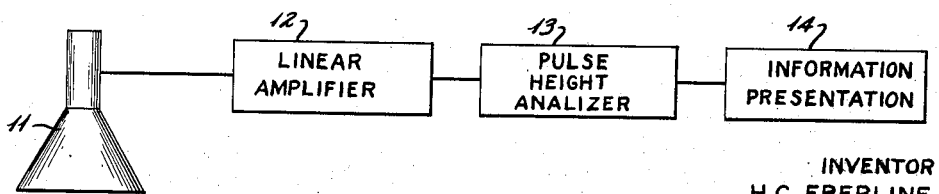

FIG. 3, a graphical representation of pulses resulting from the radiation of different energy levels and the zone showing the window of the pulses to be measured or counted by the particular equipment and method; and FIG. 4, a schematic showing of the components of the detector.

Briefly, the present invention comprises a scintillation detector for the detection of gamma rays of a particular energy level produced by a particular source of radioactive material and comprises a screen of large area having a fluorescent material such as sodium iodide which is responsive to gamma radiation.

A photo multiplier tube is provided with an optical coupling to the fluorescent screen whereby scintillations produced on the fluorescent screen by gamma rays will be amplified in the photo multiplier. The signal from the photo multiplier is then amplified by means of a linear amplifier and fed to a pulse height analyzer having a fixed window to select only pulses which terminate within the upper and lower limits of the fixed window, such fixed window serving as an over and under gate.

The pulses which terminate within such fixed window are selected and presented to an information presentation device which may be a meter to indicate the number of pulses produced by the gamma rays of the selected radioactive material being monitored thereby indicating the presence of the particular radioactive material and the quantity thereof.

The equipment may be mounted on a vehicle with the fluorescent screen spaced from the surface on which the radiation may be found at a sufficient distance to permit running the vehicle over the area being monitored without danger of the detector being damaged by small projections on the surface being monitored whereby a large area may be quickly monitored to determine the location of the source of radiation so that barricading of contaminated areas and removal of such sources can be promptly accomplished with the least interference of normal activity.

The detector equipment may be made of a size comparable with the area being monitored to detect the presence of a particular source of radiation by the proper selection of the size and location of the window of the pulse height analyzer. The invention is useful in detecting and locating radiation entering wounds or other parts of a person's body to permit removal of such radiation without unnecessary and excessive surgery.

Referring more particularly to the drawing, a vehicle such as a jeep 10 is provided with one or more scintillation type detector probes 11 and such detector probe is provided with a thin fluorescent screen of sodium iodide or the like responsive to gamma rays. The detector is mounted on the vehicle 10 with the fluorescent screen thereof positioned closely adjacent the surface suspected of containing radioactive material, but at a distance to preclude damage to the detector.

A photo multiplier tube is provided in optical coupling with such fluorescent screen to detect the scintillations on the screen and produce a usable signal. Also carried by the jeep or similar vehicle 10 are electronic circuits which include a linear amplifier 12 for amplifying the signal from the photo multiplier tube in the probe 11 which linear amplifier produces pulses which are fed to a pulse height analyzer 13 which has a window in which the heights of the pulses of the desired radioactive material terminate. Such pulse height analyzer produces a signal in response to only those pulses of the selected height which terminate in the window and such signals from the pulse height analyzer are fed to an information presentation device 14 which may be a meter to indicate the presence and the frequency of the selected pulses, the pulses selected being pulses responsive to the gamma radiation only of the particular radioactive material.

The present invention is particularly useful with respect to detection of plutonium and the fixed window setting of the pulse analyzer is made to be responsive only to the energy received from such source thereby preventing spurious radiation from other sources affecting the information presentation device.

It will be apparent that various types of information presentation devices such as meters, sound devices, recorders and the like may be used for the information presentation.

It is known that each radioactive material has a particular level of energy in the radiation of gamma rays thereof and that the present invention is useful for materials other than plutonium by the selection of and the adjustment of the window in the pulse height analyzer.

To graphically illustrate the method of analyzing, the graph arrangement shown in FIG. 3 shows a plurality of lines 15 to indicate various types of gamma radiation which may be coming from various sources such as cosmic rays or the like. The gamma rays indicated by lines 16 which have an energy level indicated by the termination of the lines 16 between limits A and B are the only gamma rays to be counted by the equipment. The electronic equipment and the presentation device 14, therefore, are arranged to indicate only such gamma radiation designated by lines 16 and from such information presentation device an observer can accurately plot the location of the contaminated area and necessary precautions can be taken to remove the radiation from such area and/or prevent persons from entering such area.

Upon reference to FIG. 2, a graph indicates the relative abundance of gamma rays with respect to the energy level of such gamma rays with the first hill in the graph indicating the normal radiation from plutonium. The energy level indicated by the curve between lines C and D is representative of gamma radiation of plutonium within a narrow range of energy level and within a narrow range of the abundance of gamma rays. It is extremely unlikely that spurious sources of gamma radiation would fall in this narrow region of energy level and consequently the window of the pulse height analyzer is selected in this range of energy level between lines C and D. By suitably controlling the window of the pulse height analyzer, only pulses resulting from gamma rays having energy levels indicated between the lines C and D are selected for feeding into the information presentation device thereby indicating the presence of plutonium with an extremely high degree of accuracy.

The second hill of the graph (FIG. 3) indicates the energy of gamma rays and their abundance in nuclear fission, for example, and the graph is intended to generally indicate the characteristics which make this method and apparatus practical.

Although the equipment and the method are particularly useful with plutonium they may be adaptable to the detection of other materials emitting gamma rays.

It will be obvious to those skilled in the art that various changes may be made in the invention without departing from the spirit and scope thereof and therefore the invention is not limited by that which is illustrated in the drawing and described in the specification, but only as indicated in the accompanying claim.

What is claimed is:

A detector for plutonium scattered over a surface comprising a vehicle for guided passage over the surface, a detector head including a fluorescent screen responsive to gamma radiation from plutonium, means to mount said detector head on the vehicle close to the surface of the ground while spaced therefrom so that the screen thereof is located at a position away from the vehicle whereby contamination on the vehicle will not produce a response on the screen, and a housing covering said fluorescent screen and a photomultiplier in said housing in coupled arrangement with said fluorescent screen whereby a scintillation produced on said fluorescent screen from gamma radiation will produce an impulse in said photomultiplier tube, a linear amplifier, a pulse height analyzer and an information presentation device on said vehicle, said pulse height analyzer being of the predetermined window type for the passage of scintillations resulting from a limited range of gamma radiation whereby the information presentation will indicate only the gamma rays corresponding to the predetermined window opening, said structure providing for ready monitoring of the surface suspected of contamination from plutonium with a minimum of danger to the personnel doing the monitoring and the collecting of the information.

References Cited in the file of this patent

UNITED STATES PATENTS

| | | |
|---|---|---|
| 2,656,471 | Herzog | Oct. 20, 1953 |
| 2,703,367 | Florman | Mar. 1, 1955 |
| 2,778,947 | Scherbatskoy | Jan. 22, 1957 |
| 2,830,185 | Scherbatskoy | Apr. 8, 1958 |
| 2,879,663 | Thomas | Mar. 31, 1959 |
| 2,888,568 | Jones et al. | May 26, 1959 |
| 2,935,614 | Leichmann et al. | May 3, 1960 |

OTHER REFERENCES

Upson et al.: Analyzing for Low Energy Gamma Emitters, Nucleonics, April 1955, pp. 38 to 41.

Venable: Simple Recording Gamma Ray Spectrometer, Nucleonics, July 1957, pp. 84 to 85.